United States Patent [19]
Dillard

[11] 4,023,028
[45] May 10, 1977

[54] METHOD AND APPARATUS FOR COMPUTING THE DISCRETE FOURIER TRANSFORM RECURSIVELY

[75] Inventor: George M. Dillard, San Diego, Calif.

[73] Assignee: The United States of America as represented by the Secretary of the Navy, Washington, D.C.

[22] Filed: Aug. 20, 1974

[21] Appl. No.: 498,888

[52] U.S. Cl. .............................................. 235/156
[51] Int. Cl.² ................................... G06F 15/34
[58] Field of Search .......... 235/156, 152; 324/77 B, 324/77 D

[56] References Cited
UNITED STATES PATENTS

| | | | |
|---|---|---|---|
| 3,586,843 | 6/1971 | Sloane | 235/156 |
| 3,778,606 | 12/1973 | Schmitt et al. | 235/156 |
| 3,816,729 | 6/1974 | Works | 235/156 |
| 3,851,162 | 11/1974 | Munoz | 235/156 |

OTHER PUBLICATIONS

G. M. Dillard, "Recursive Computation of the DFT, With Applications to a Pulse–Doppler Radar System", Comput. and Elec. Engng., vol. 1, No. 1, pp. 143–152, June, 1973.

Primary Examiner—David H. Malzahn
Attorney, Agent, or Firm—R. S. Sciascia; G. J. Rubens; H. Fendelman

[57] ABSTRACT

A wholly digital system for computing the discrete Fourier transform of sequentially received data in a recursive fashion. Two parallel shift registers store and shift the real and imaginary components of the complex number $X_k + iY_k$. The data in the parallel registers are successively shifted one bit per strobe in response to receipt of new data. Additional logic operates recursively on successive data inputs to compute the discrete Fourier transform.

5 Claims, 5 Drawing Figures

METHOD AND APPARATUS FOR COMPUTING THE DISCRETE FOURIER TRANSFORM RECURSIVELY

BACKGROUND OF THE INVENTION

The Fourier transform is used for characterizing linear systems when continuous waveforms are involved. However, for sampled data the discrete Fourier transform (DFT) is the tool that is applied. The fast Fourier transform is simply an efficient computational method for obtaining the DFT.

For a sequence $Z_0 \ldots , Z_{N-1}$, of sampled waveform data (either real or complex), the DFT is defined as $$W(j) = \sum_{K=0}^{N-1} Z_K e^{-2\pi i j K/N} \qquad (1)$$

For $j = 0, 1 \ldots, N-1$. (Some authors include a factor $1/N$ in the definition of $W(j)$. An implicit assumption in the definition of $W(j)$ is that the samples are obtained at equally spaced time intervals $T_0$. The fundamental frequency is $f_0 = 1/T$, where $T = NT_0$, and the frequency corresponding to each index $j$ is $jf_0$. Several other properties of the DFT and FFT are described in "A Guided Tour of the Fast Fourier transform," G. D. Bergland, *IEEE Spectrum*, Volume 6, p. 41–52, July 1969.

SUMMARY OF THE INVENTION

Applicant's invention pertains to a simple recursive method that can be applied in the computation of the DFT. In certain practical situations, the data $Z_0 \ldots , Z_{N-1}$, are received sequentially, and computation of the DFT (either the fast or slow DFT) cannot be completed until the final datum $Z_{N-1}$ is received. However, if the DFT is computed recursively as described below, only a small number of operations need be made after the receipt of $Z_{N-1}$ (an operation is defined herein as the performance of a complex addition followed by a complex multiplication). Even if the method of computing the DFT recursively requires many more total operations than would the FFT, the required time measured from receipt of $Z_0$, might be insignificantly different.

To implement the technique of the present invention, Applicant has derived the "moving-window" discrete Fourier transform (MWDFT) as described below.

Rather than treat the special case where the DFT of the sequence $Z_0, Z_1 \ldots , Z_{N-1}$ is computed, Applicant treats a more general situation described as follows. Let $Z_0, Z_1 \ldots , Z_m \ldots$ , be an infinite sequence of sampled waveform data, where $Z_k$ (possibly complex) is the value of the function $Z(t)$ obtained at time $t = KT_0$. Assume that for each $n = 0, 1 \ldots$ , the DFT of $Z_n, Z_{n+1} \ldots , Z_{n+N-1}$ is of interest. That is, the "moving-window" discrete Fourier transform (MWDFT) is computed. A recursive method of computing the MWDFT is derived below. This recursive method will, of course, also apply to the computation of the DFT of $Z_0 \ldots , Z_{N-1}$, i.e. the DFT of a finite data input.

For each $N = 0, 1 \ldots$ the MWDFT $W(j,n)$ is defined herein as $$W(j,n) = \sum_{K=0}^{N-1} Z_{K+n} e^{-2\pi i j K/N} \qquad (2)$$

for $j = 0, 1 \ldots , N-1$. From (2) it follows that $$W(j,n+1) = \sum_{K=0}^{N-1} Z_{K+n+1} e^{-2\pi i j K/N} \qquad (3a)$$

and $$W(j,n+1) = e^{2\pi i j/N} \sum_{K=1}^{N} Z_{K+n} e^{-2\pi i j K/N}. \qquad (3b)$$

A manipulation of (3b) gives the desired recursive formula (4a) $W(j,n+1) = [W(j,n)+Z_{N+n}-Z_n] e^{2\pi i j/N}$,
(4b) $W(j,0) = W(j)$, where $W(j)$ is defined in (1) above.

The present invention provides an apparatus for computing the MWDFT as derived in equation (4) above. It should be noted that for each $n$ the calculation of $Z_{N+n}-Z_n$ is independent of the index $j$ of the Fourier coefficients being computed. Thus, the total number of operations, as defined previously, for each $n$ is just $N$, neglecting the one-time calculation of $Z_{N+n}-Z_n$. Accordingly, the present invention provides the basic requirement of computational speed. In some cases not all of the Fourier coefficients are of interest. In such cases the total number of operations to be performed are decreased and the time per operation can be increased accordingly. Also, the recursive method of the present invention does not require that $N$ be a power of 2; the number of operations for computing all coefficients is merely $N$.

The recursive method of equation (4) requires computation of the initial value $W(j,0) = W(j)$, which is defined in (1). This can be accomplished by the recursive formula (5a) $W'(j,m+1) = [W'(j,m)+Z_{m+1}] e^{2\pi i j/N}$ and (5b) $W'(j,0) = Z_0 e^{2\pi i j/N}$ $m = 0, 1 \ldots , N-2$. The desired initial value is $W(j,0) = W'(j,N-1)$. Equation (5) can be verified by applying (4) to the sequence obtained by inserting $N-1$ zeros at the beginning of the sequence $Z_0, Z_1 \ldots ,$ .

STATEMENT OF THE OBJECTS OF INVENTION

It is a primary object of the present invention to provide a novel technique and apparatus for computing the DFT.

It is another object of the present invention to provide a method and apparatus for computing the DFT in a "moving-window" fashion.

It is another object of the present invention to provide a method and means for computing the DFT in a recursive fashion.

Other objects, advantages and novel features of the invention will become apparent from the following detailed description of the invention when considered in conjunction with the accompanying drawings.

DESCRIPTION OF THE PREFERRED EMBODIMENTS

Figure 1:
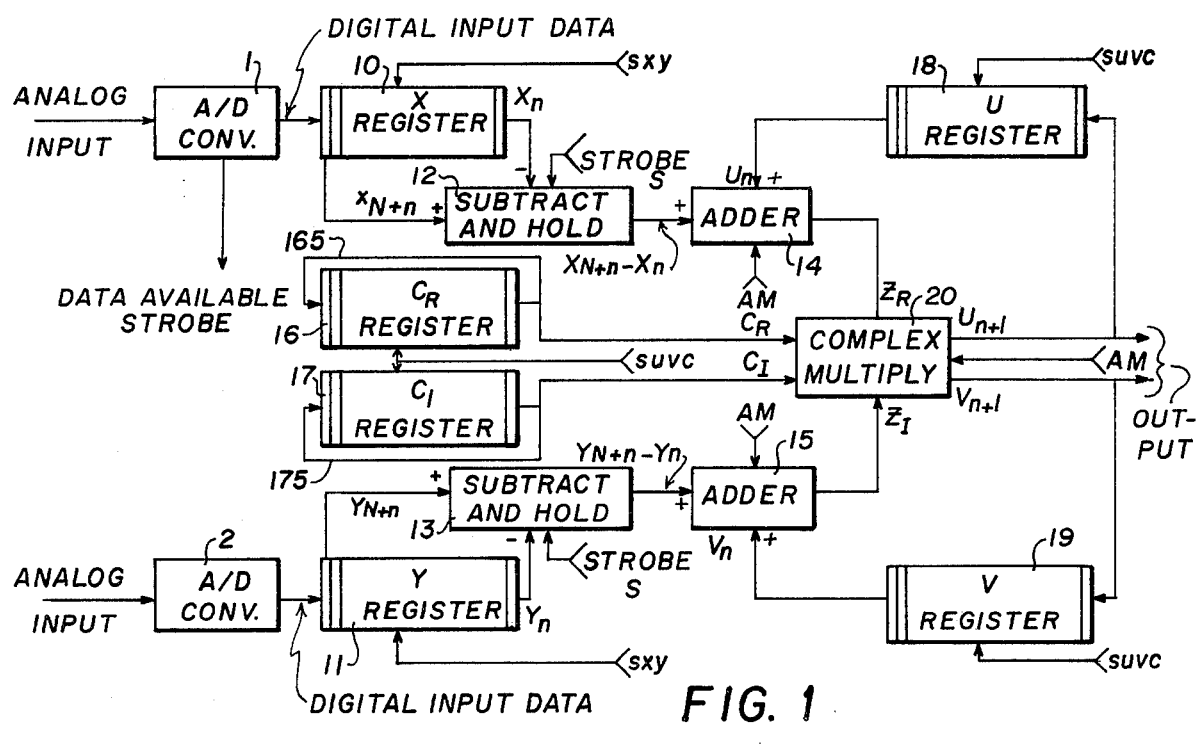
FIG. 1 is a network diagram of the recursive Fourier transform computer of the instant invention.

The DFT to be computed recursively is defined in equations (2) through (4) above. A block diagram of this invention is shown in FIG. 1 to which the timing diagram of FIG. 4 relates as indicated below. Referring to FIG. 1, X and Y registers 10 and 11 are registers that are capable of storing and shifting $N+1$ multi-bit data obtained as digital input data from suitable input sources such as A/D converters 1 and 2. The digital input data are assumed to consist of $b$-bits each. For example, registers 10 and 11 could consist of $b$ parallel $(N+1)$-bit shift registers. The U and V registers 18 and 19 are also capable of storing and shifting N multi-bit data that are obtained as a result of the arithmetic operations described below. The $C_R$ and $C_I$ registers 16 and 17 are for storage of N digital (binary) constants. These registers may consist of parallel shift registers, as indicated above for registers 10 and 11, or may comprise programmable read-only memories (PROMS), addressable core storage, etc. Feedback paths 165 and 175 are provided for registers 16 and 17, respectively, for the purpose of regeneration of the stored constants.

Referring to the block diagram of FIG. 1 and the timing diagram of FIG. 4, the recursive computation is performed by the apparatus of the instant invention as follows. Upon occurrence of the data-available strobe from A/D converter 1, registers 10 and 11 are shifted right one bit and the new digital data are inserted as the left most data in the registers. Those data which, prior to shifting, were the right most data in the registers are discarded as belonging to the previous "window" of data. Thus, after each SXY pulse, registers 10 and 11 contain the $N+1$ previously obtained data $X_n, X_{n+1} \ldots, X_{n+N}; Y_n, Y_{n+1} \ldots Y_{n+N}$. The data $(X_k, Y_k)$ are considered as components of the complex number $X_k + iY_k$, $i = \sqrt{-1}$. At the occurrence of strobe S, the subtract and hold circuits 12 and 13 compute the differences $X_{N+n}-X_n$ and $Y_{N+n}-Y_n$ and hold these differences for use in future computations described below. The two subtract and hold circuits 12 and 13 together perform the calculation of $Z_{N+n}-Z_n$ indicated in equation (4a). By definition herein $Z_k = X_{k+i} Y_k$. At the occurrence of each add and multiply strobe (AM), adder networks 14 and 15 add the contents of the subtract and hold networks to the left most data in the U and V registers 18 and 19. This is the computation of $W(j,n) +Z_{N+n} -Z_n$ indicated in equation (4a) above. The results of these additions, labeled $Z_R$ and $R_I$ in FIG. 1 are multiplied by the constants $C_R$ and $C_I$ in the complex multiply network 20. The complex multiplier outputs are defined as $U_{n+1} = C_R Z_R - C_I Z_I$ and $V_{n+1} = C_R Z_R + C_I Z_R$. The constants $C_R$ and $C_I$ are the real and imaginary parts, respectively, of $e^{2\pi ij/N}$, where the index $j$ denotes the number of SUVC (shift U, V, and C) pulses that have occurred prior to the current multiplication being performed. After each multiplication is performed, a SUVC pulse occurs, thus causing new constants $C_R$ and $C_I$ to be available for the next multiply cycle, causing new data to appear as the left most data in the registers 18 and 19, and causing the results of the complex multiplication just performed to be entered as the right most data of the registers 18 and 19. After the $N^{th}$ SUVC pulse, the registers 18 and 19 contain the real and imaginary parts respectively of $W(j,n+1)$, $j=0, 1, \ldots, N-1$, where $W(j,N+1)$ is defined in equation (4a) above. As described above, computation of the initial value $W(j,0)$ is accomplished by inserting $N-1$ zeros at the beginning of the sequence $Z_0, Z_1 \ldots,$.

Figure 2:
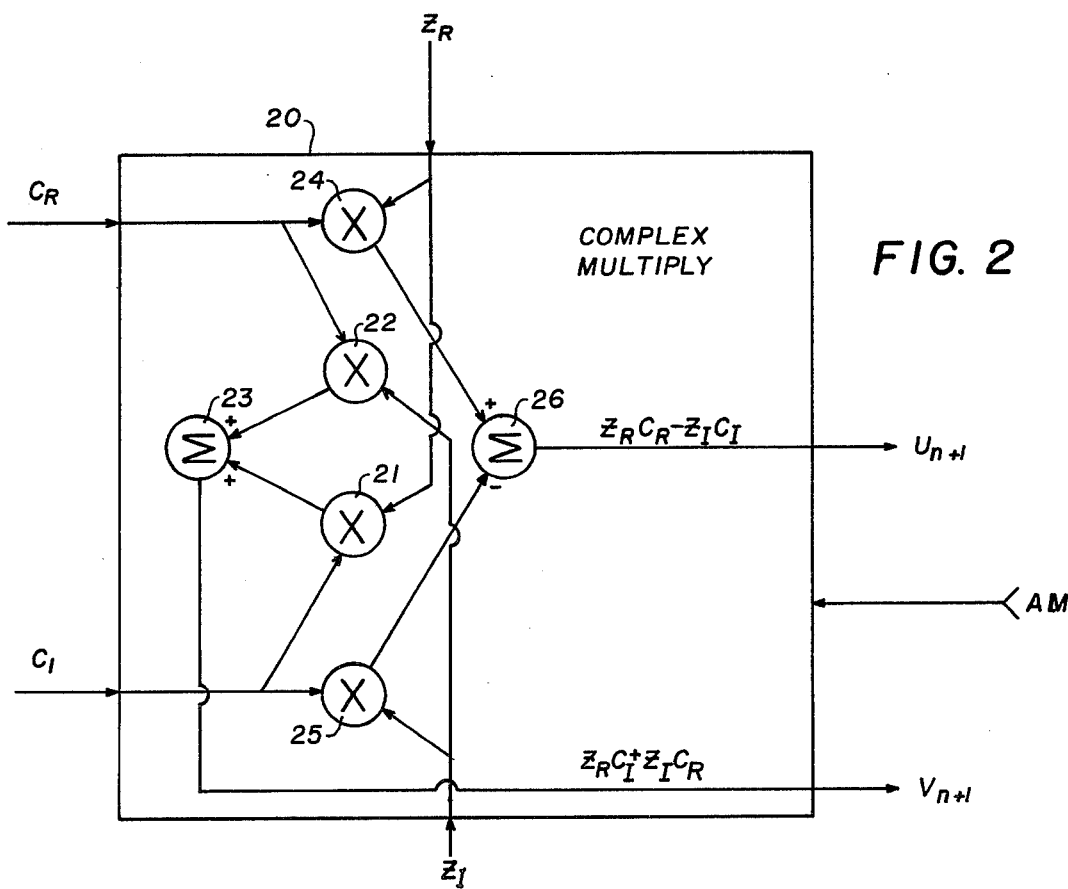
FIG. 2 is a network diagram of the complex multiply network of FIG. 1.

The details of the complex multiply network 20 are illustrated in FIG. 2. It is readily apparent that component $Z_R$ is multiplied by component $C_R$ in multiplier unit 24 to obtain product $Z_R C_R$. Likewise, the component $Z_I$ is multiplied by the component $C_I$ in multiplier 25 to obtain the product $Z_I C_I$ which is subtracted from $Z_R C_R$ in summing unit 26. Similarly, the quantity $Z_R C_I + Z_I C_R$ is obtained by processing the components $Z_R$, $Z_I$, $C_I$, and $C_R$ through adder 23 and multipliers 21 and 22.

The $C_I$ and $C_R$ registers 16 and 17 each hold N constants. The $C_I$ register 17 holds the imaginary part of $e^{2\pi ij/N}$, $j=0, 1, \ldots, N-1$, and the $C_R$ register 16 holds the real part of $e^{2\pi ij/N}$, $j=0, 1, \ldots, N-1$. For a shift register implementation of 16 and 17, these constants are read in initially through parallel shift register inputs, by programmable switches, or by any other conventional means of inserting data into shift registers. Similarly, for an addressable core storage, the constants are initially inserted in any conventional manner for reading data into a core storage. For PROM implementation, the constants are inserted as a part of the "programming" of the PROM.

Figure 3:
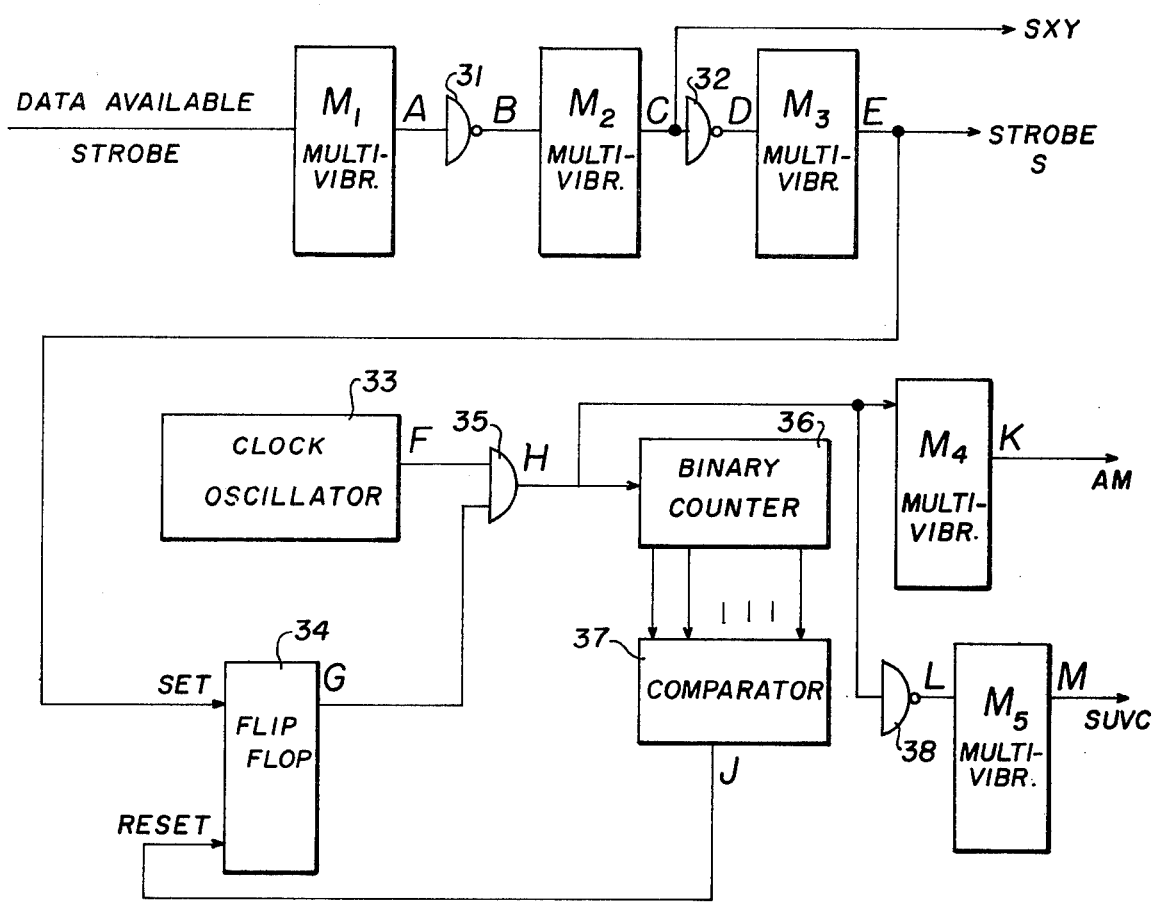
FIG. 3 is a network diagram of the timing generator of the present invention.
Figure 4:
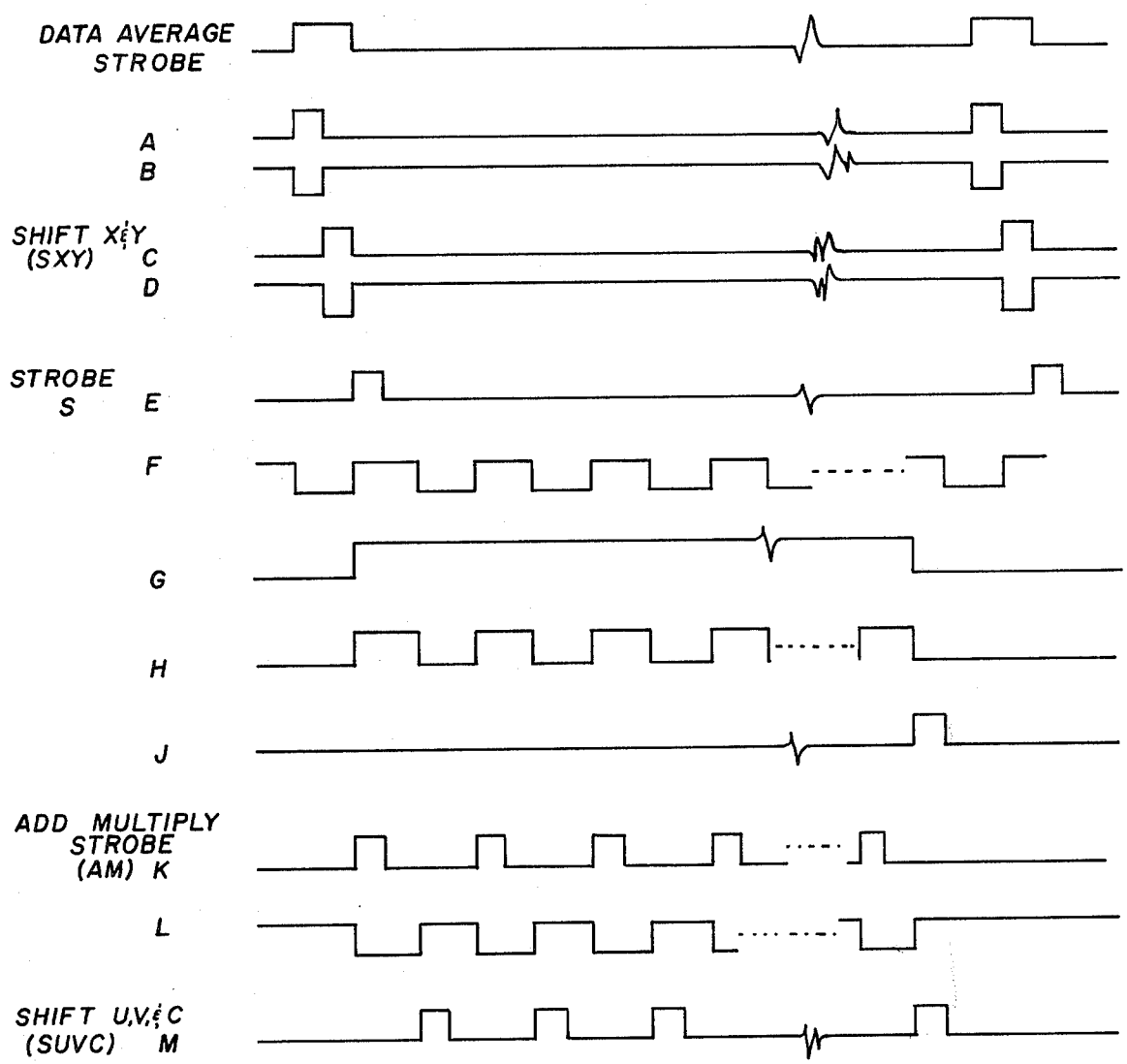
FIG. 4 is a timing diagram of the timing pulses produced by the timing generator of FIG. 3.

The details of the timing generator for producing the timing signals illustrated in FIG. 4 are shown in FIG. 3. As seen in FIG. 3, the data available strobe is input to the monostable multivibrator M1 which generates a pulse (labelled A) of some specified length (the length of the pulse depends upon the rate at which computations are made and may differ from one application to the next). This pulse is inverted by inverter 31 and the end of pulse A causes multivibrator M2 to generate pulse C which is output as the SXY pulse of FIG. 1 and is also inverted by inverter 32 to produce pulse D to trigger multivibrator M3. Multivibrator M3 generates pulse E which is output as strobe S and is also used to set Flip Flop G. Flip Flop G gates the clock oscillator 33 output F into the binary counter 36 through AND gate 35 and into multivibrator M4. The binary counter 36 counts the number of pulses H at its output and when the count reaches N, comparator 37 produces pulse J which resets Flip Flop G. Thus, exactly N output pulses H are produced. Outputs H are furnished to multivibrator M4 to produce outputs K which are the add and multiply (AM) pulses of FIG. 1. Outputs H are also inverted by inverter 38 to produce output L which in turn triggers multivibrator M5 to produce outputs M which are furnished as the SUVC pulses of FIG. 1.

In the discussion above, it was assumed that all N coefficients $W(j,n) = 0, 1 \ldots N-1$ are of interest. If only $K$ ($K<N$) are of interest, then only those $K$ corresponding constants need be stored, and the size of the registers 18 and 19 can be decreased accordingly. Also if the input data are real, only the X register 10 is necessary for the input data and the V register 19 would be connected directly to the complex multiply circuit 20, i.e., $Z_I = V_n$.

Figure 5:
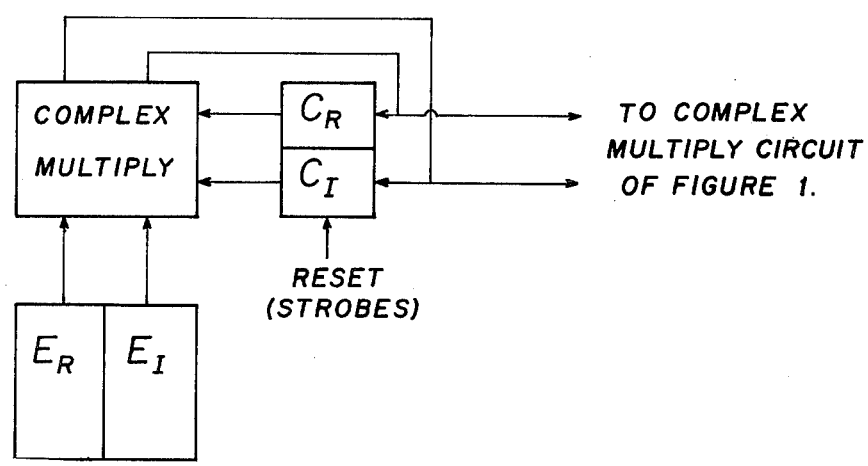
FIG. 5 is a network diagram of an alternative method of obtaining the complex constants of the instant invention.

An alternative for generating the complex constants $C_R$ and $C_I$ is shown in FIG. 5. Instead of storing all of the constants, they are generated as needed. Since the $j^{th}$ constant is defined as $e^{2\pi ij/N}$, it follows that the $(j+1)^{th}$ constant can be found by the simple complex multiplication $e^{2\pi i(j+1)/N} = e^{2\pi ij/N} e^{2\pi i/N}$. But, by definition, $e^{2\pi i/N} = \cos(2\pi/N) + i\sin(2\pi/N)$, $i = \sqrt{-1}$; also, $e^{2\pi ij/N} = \cos(2\pi j/N) + i\sin(2\pi j/N)$ for $j = 0, 1, \ldots, N-1$. Thus, if $C_R$ and $C_I$ are initially set to 0 and 1 respectively, and if $E_R$ and $E_I$ are the stored constants $\cos 2\pi/N$ and $\sin 2\pi/N$, respectively, then, the appropriate constants can be found by the complex multiplication indicated in FIG. 5.

Alternatives to the embodiments illustrated include alternate methods of data storage, e.g., core storage instead of shift registers. Also parallel adder/complex multipliers can be used so that all N (or fewer if desired) DFT coefficients can be computed simultaneously.

The advantage of the present invention is that the computation of the DFT for sequentially received data requires very little time after the receipt of the final datum for which the transforms are computed. Also, the instant invention provides the capability of computing the DFT in a moving-window fashion. This is significant in radar and communications applications where unknown signal arrival times makes moving-window detection necessary. Another advantage of the present invention is that the circuitry for performing the computations is all digital, thus lending to simplicity, reliability, and commonality.

Obviously many modifications and variations of the present invention are possible in the light of the above teachings. It is, therefore, to be understood that within the scope of the appended claims the invention may be practiced otherwise than is specifically described.

What is claimed is:

1. An apparatus for computing the discrete Fourier transform of a waveform comprising:

input register means for receiving a series of digital data samples representative of said waveform;
    subtract and hold means connected to said input register means for subtracting the oldest data sample stored in said input register from the newest data sample stored in said input register means;
    an adder network connected to the output of said subtract and hold means;
    a multiplier network having a first input connected to the output of said adder network and having a second input;
    constants storage means connected to said second multiplier network input for outputting to said multiplier network a series of predetermined digital constants;
    output register means having an input connected to said multiplier network and an output connected to said adder network second input;
    timing means for gating said input and output register means, said subtract and hold means, said adder network, said multiplier network and said constants storage means at predetermined intervals.

2. The apparatus of claim 1 wherein:

said input register means comprises first and second input register means for receiving the real and imaginary components respectively of said digital data samples;
    said subtract and hold means comprises first and second subtract and hold means;
    said adder network comprises first and second adders;
    said constants storage means comprises first and second constants storage devices; and
    said output register means comprises first and second output register means.

3. The apparatus of claim 2 wherein said first constants storage device holds the real part of $e^{2\pi ij/N}$, $j = 0, 1, \ldots, N-1$ and said second constants storage device holds the imaginary part of $e^{2\pi ij/N}$, $j = 0, 1, \ldots, N-1$ where $i = \sqrt{-1}$, $j =$ an index indicating a particular Fourier coefficient and $N =$ the number of digital samples stored in said input register means minus 1.

4. The apparatus of claim 3 wherein said timing means simultaneously gates said first and second input registers in response to each digital data sample;

said timing means simultaneously gates said first and second subtract and hold means subsequent to each gate to said input registers;
    said timing means simultaneously gates said first and second adders and said multiplier network with a first series of pulses subsequent to each gate to said first and second subtract and hold means; and
    said timing means gates said constants storage means and said output registers with a second series of pulses, each pulse of said second series of pulses following a pulse of said first series of pulses;
    whereby in response to the receipt of each digital data sample, said first output register contains a series of the real part of Fourier coefficients and said second output register contains a series of the imaginary part of Fourier coefficients.

5. A method of computing the discrete Fourier transform of a waveform comprising the steps of:

receiving a series of digital data representative of said waveform;
    storing sequentially said series of digital data representative of said waveform;
    subtracting the oldest stored data from the newest stored data to obtain a difference each time a data is received;
    generating a series of predetermined constants;
    providing an output shift storage means;
    adding sequentially each of the data stored in said output shift storage means to said difference to produce a series of addition signals;
    multiplying each addition signal by a predetermined constant from said series of predetermined constants to obtain a series of products;
    sequentially storing said series of products in said output shift storage means;
    whereby said output shift storage means contains a series of Fourier coefficients.

* * * * *